(12) United States Patent
Singh et al.

(10) Patent No.: US 12,273,780 B2
(45) Date of Patent: Apr. 8, 2025

(54) INTELLIGENT PAN MIGRATION IN A WIRELESS MESH NETWORK

(71) Applicant: Landis+Gyr Innovations, Inc., Alpharetta, GA (US)

(72) Inventors: Shobhit Kumar Singh, Ghaziabad (IN); Anil Tyagi, Greater Noida (IN); Dipanshu Mittal, Rajasthan (IN); Mudit Goyal, Noida (IN)

(73) Assignee: Landis+Gyr Technology, Inc., Alpharetta, GA (US)

( * ) Notice: Subject to any disclaimer, the term of this patent is extended or adjusted under 35 U.S.C. 154(b) by 476 days.

(21) Appl. No.: 17/865,026

(22) Filed: Jul. 14, 2022

(65) Prior Publication Data

US 2024/0022979 A1 Jan. 18, 2024

(51) Int. Cl.
*H04W 36/14* (2009.01)
*H04W 36/00* (2009.01)
*H04W 84/18* (2009.01)

(52) U.S. Cl.
CPC . *H04W 36/00837* (2018.08); *H04W 36/0058* (2018.08)

(58) Field of Classification Search
None
See application file for complete search history.

(56) References Cited

U.S. PATENT DOCUMENTS

| | | | | |
|---|---|---|---|---|
| 6,834,192 | B1* | 12/2004 | Watanabe | H04W 36/035 455/437 |
| 2003/0099212 | A1* | 5/2003 | Anjum | H04W 92/02 370/328 |
| 2016/0134468 | A1* | 5/2016 | Hui | H04L 45/02 709/224 |
| 2023/0379782 | A1* | 11/2023 | Thubert | H04W 28/086 |

FOREIGN PATENT DOCUMENTS

EP 2661127 A1 11/2013

OTHER PUBLICATIONS

Chen , et al., "Service-Aware Node Migration for Low-power and Lossy Networks", XP013176314, Nov. 2 , 2017, pp. 1-15.
PCT Patent Application No. PCT/US2023/027543 , International Search Report and Written Opinion, Nov. 3, 2023, 17 pages.

* cited by examiner

*Primary Examiner* — Scott M Sciacca
(74) *Attorney, Agent, or Firm* — Kilpatrick Townsend & Stockton LLP

(57) ABSTRACT

Techniques described herein relate to intelligent migration between personal area networks (PANs) of a wireless mesh network. In one example, a method includes receiving, by a node connected to a first PAN, a packet from a second PAN. Based on the packet, the node determines that a second instability factor related to stability of the second PAN differs by at least a margin from a first instability factor related to stability of the first PAN. The node transmits, to a neighboring node in the first PAN, a migration notification (Continued)

message indicating that the node is migrating and receives, from the neighboring node in the first PAN, a request for the node to remain in the first PAN. The node applies one or more rules to reject the request for the node to remain in the first PAN and, based on rejecting the request, proceeds to complete the migration.

20 Claims, 5 Drawing Sheets

INTELLIGENT PAN MIGRATION IN A WIRELESS MESH NETWORK

TECHNICAL FIELD

Some implementations described herein relate to a wireless mesh network and, more specifically, to intelligent personal area network (PAN) migration of an endpoint in a wireless mesh network.

BACKGROUND

Typically, a wireless mesh network includes various nodes having pairwise connections that, together, form a wireless mesh by which the nodes can communicate with one another. More specifically, nodes are connected together to form groups known as personal area networks (PANs), where each PAN is coordinated by a respective PAN coordinator, and nodes within a PAN provide communication routing services or other services to other nodes in the PAN. Each PAN coordinator can be in direct or indirect communication with a headend system, which can provide services to the wireless mesh network as a whole.

In low power or lossy wireless mesh network, PAN selection for a given node can determine whether that node is able to perform its operations efficiently. For instance, if a current PAN of a node that is an endpoint is unstable, such that the resource cost of routing a data packet is high or such that link quality (i.e., reachability) between neighboring nodes is too low, then the endpoint may be unable to participate in communications in a timely manner. For instance, if the endpoint is a utility meter and the wireless mesh network is a smart meter network, then instability in the PAN to which the utility meter belongs can cause the utility to fail to properly report utility usage. As such, a node can migrate from one PAN to another PAN within the wireless mesh network to improve stability within the wireless mesh network.

For instance, a node can migrate from a first PAN to a second PAN upon determining that an instability factor of the second PAN is sufficiently better (e.g., lower by a margin) than an instability factor of the first PAN to which the endpoint currently belongs. Upon making this determination, the endpoint leaves the first PAN and requests to join the second PAN.

SUMMARY

In one implementation described herein, a method includes receiving, by a node connected to a first personal area network (PAN), a packet from a second PAN other than the first PAN. Based on the packet, the node determines that a second instability factor related to stability of the second PAN differs by at least a margin from a first instability factor related to stability of the first PAN. The node transmits, to a neighboring node in the first PAN, a migration notification message indicating that the node is migrating and receives, from the neighboring node in the first PAN, a request for the node to remain in the first PAN. The node applies one or more rules to the request to reject the request for the node to remain in the first PAN and, based on rejecting the request, proceeds to complete the migration.

In another implementation described herein, a system includes a subject node and a neighboring node, both connected to a first PAN. The subject node is configured to identify a destination PAN as a target of migration and transmit, to one or more neighboring nodes, a notification that the subject node is migrating to the destination PAN. The neighboring node is configured to receive the notification from the subject node and to determine a reason, selected from a predetermined set of reasons, for objecting to migration of the subject node. The neighboring node is further configured to transmit to the subject node a request to terminate the migration. The subject node is further configured to exit the first PAN and join the destination PAN, based on prioritizing an anticipated improvement in stability due to the migration over the reason associated with the request from the neighboring node.

In yet another implementation described herein, a computing device is connected to a first PAN of a wireless mesh network. The computing device includes a processor and a memory. The processor is configured to execute computer-readable instructions, and the memory is configured to store the computer-readable instructions that, when executed by the processor, cause the processor to perform operations. The operations include receiving a packet from a second PAN other than the first PAN and determining, based on the packet, that a second instability factor related to stability of the second PAN differs by at least a margin from a first instability factor related to stability of the first PAN. The operations further include transmitting, to a neighboring node in the first PAN, a migration notification message indicating that the computing device is migrating and receiving, from the neighboring node in the first PAN, a request for the computing device to remain in the first PAN. The operations further include applying one or more rules to the request to reject the request for the computing device to remain in the first PAN and, based on rejecting the request, proceeding to complete migration to the second PAN.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

As described above, a subject node (i.e., a particular node) in a wireless mesh network can migrate from a first personal area network (PAN) to a second PAN upon determining that stability in the second PAN is sufficiently better than stability in the first PAN. However, there are various drawbacks with the manner in which PAN migration currently occurs. For instance, when the subject node leaves the first PAN, former child nodes of the subject node are left without a parent and must then abruptly locate respective new parents. In some cases, there may be no node in the first PAN with adequate signal strength with respect to the child node to act a new parent. That child node may even be a critical node, in that a service it provides is deemed of critical importance to the wireless mesh network. Leaving a critical node without a parent is undesirable. In short, when the subject node makes a unilateral choice to leave the PAN, and does so without warning, this can leave the rest of the PAN in an undesirable situation that can harm the wireless mesh network as a whole.

Some implementations described herein address these issues of existing PAN migration techniques. In some implementations, a subject node is capable of at least two migration modes, referred to herein as a hard migration mode and a soft migration mode. Using the hard migration mode, also referred to herein as hard migration, a subject node notifies its neighboring nodes (e.g., its child nodes or other reachable nodes) in its current PAN of its intention to migrate, and those neighboring nodes have an opportunity to object. Using the second migration mode, referred to herein as soft migration, the subject node notifies its neighboring nodes as well as the PAN coordinator, and additionally, the subject node performs a gradual migration that enables it to begin a join process with another PAN while continuing to provide services to its current PAN, thus improving stability from a unilateral perspective while enabling nodes in its current PAN to make anticipatory adjustments as needed. With either migration mode, the subject node can reevaluate its decision to migrate based on feedback from other nodes. Thus, in contrast to existing techniques in which migration is determined unilaterally based only on a comparison of instability factors, some implementations described herein consider a wider range of factors and, if needed, provide a smoother transition for impacted nodes.

Example of a Wireless Mesh Network Supporting Migration Modes

Figure 1:
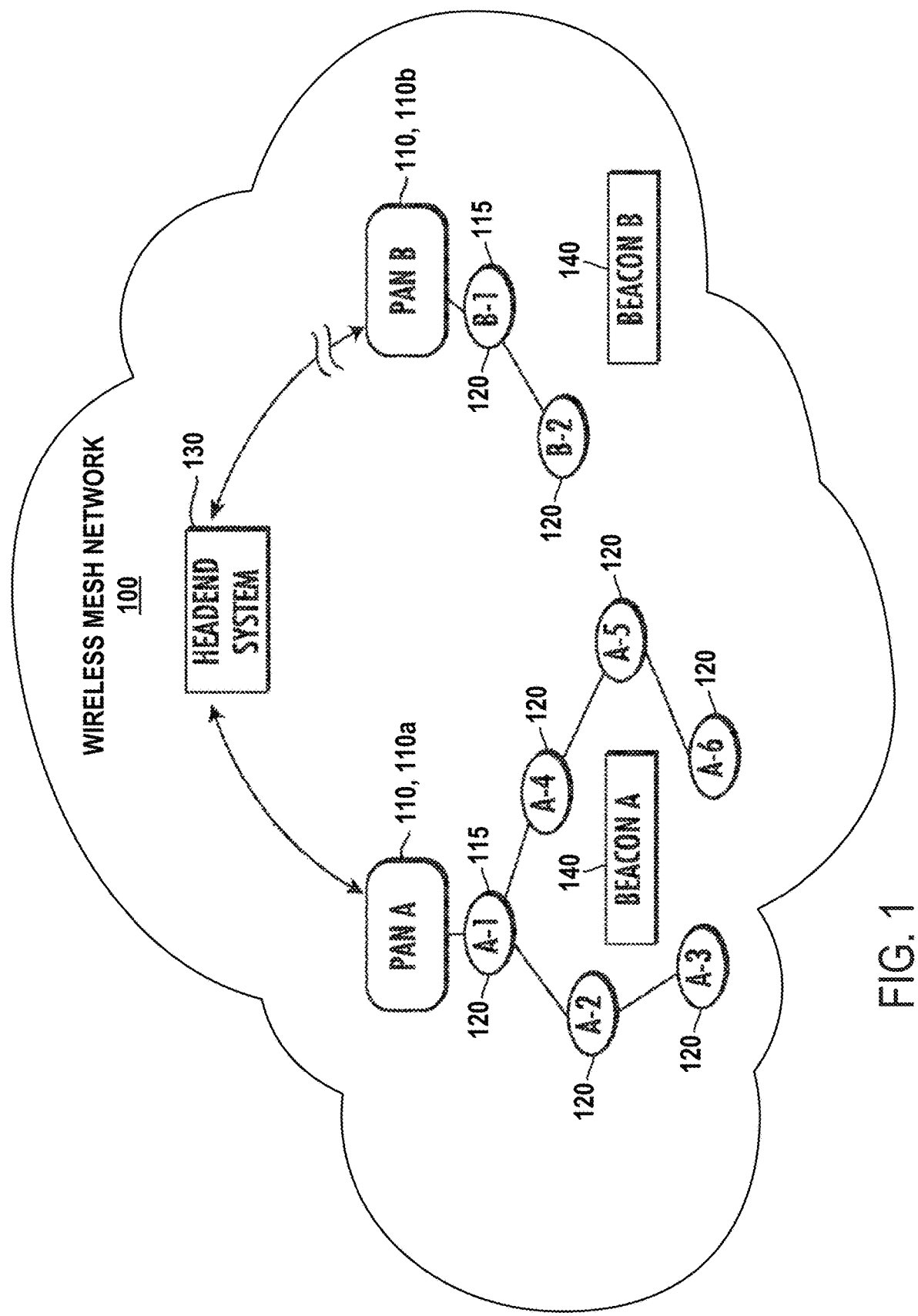
FIG. 1 is a diagram of a wireless mesh network according to some implementations described herein.

FIG. 1 is a diagram of a wireless mesh network 100 according to some implementations described herein. As shown in FIG. 1, the wireless mesh network 100 may include two or more PANs 110, such as a first PAN 110a and a second PAN 110b. An example PAN 110 includes a respective PAN coordinator 115 and one or more nodes 120. Each node 120 can, but need not, be an endpoint such as a utility meter. In some implementations, each node 120 may be a computing device, such as a utility meter, gateway, or some other computing device having a radio and capable of participating in communications in the wireless mesh network 100. As also shown in FIG. 1, an example of the wireless mesh network 100 includes a headend system 130. The headend system 130 provides one or more services to the nodes 120, such as pushing out firmware updates or collecting utility usage or other data for processing and billing.

In some implementations, the wireless mesh network 100 can include various types, or classes, of nodes 120. Such classes may include the following: critical, battery operated, or normal. In some implementations, a critical node 120 is a node that performs a service deemed (e.g., by an administrator) to be critical, such as performing a distributed access (DA) service for the PAN 110 or for the wireless mesh network 100 or a utility network as a whole. If a critical node 120 were to shut down or lose communication capability with other nodes 120 in the wireless mesh network 100, a critical function of the wireless mesh network 100 would suffer. A battery-operated node 120 is a node that is running on battery power, rather than being wired to an external power source. If a node 120 does not belong to some other designated class (e.g., critical or battery operated), then a node 120 may be deemed a normal node 120.

In some implementations, the PAN coordinator 115 of a PAN 110 maintains node data about the nodes 120 in the PAN 110. For instance, when a node 120 joins a PAN 110, the node's new parent within the PAN 110 transmits information about the node 120 to the PAN coordinator 115. For instance, that information may be routed through the pairwise-connected nodes 120 of the PAN 110 to the PAN coordinator 115. If a node 120 leaves the PAN 110, a parent node 120 of the node 120 may similarly inform the PAN coordinator 115. The PAN coordinator 115 may store this information in a set of node data describing all the nodes 120 in the PAN 110 as well as their relationships to one another. The node data may thus include a mesh tree, which indicates relationships among parent and child nodes 120 of the PAN 110.

In the example of FIG. 1, Nodes A-1, A-2, A-3, A-4, A-5, and A-6 belong to PAN A, which has Node A-1 as its PAN coordinator 115, and Nodes B-1 and B-2 belong to PAN B, which has Node B-1 as its PAN coordinator 115. As shown by the lines connecting nodes 120 in FIG. 1, certain nodes 120 are directly connected pairwise to other nodes 120 within a shared PAN. For instance, the connectedness between two nodes 120 of a PAN 110 is due to the radio signal strength of each such node being sufficient that the two nodes 120 can directly communicate with one another. Such two nodes 120 are therefore considered neighboring nodes 120. In the example of FIG. 1, Node A-5 is directly connected to Nodes A-4 and A-6 and is thus a neighboring node 120, also referred to as a neighbor, to each of Nodes A-4 and A-6. Specifically, Nodes A-5 and A-4 are neighboring nodes 120 to each other, and Nodes A-5 and A-6 are also neighboring nodes 120 to each other. More generally, with respect to a given node 120, a neighboring node 120 may be a node 120 that shares a PAN 110 with a given node 120, and the given node 120 and the neighboring node 120 can receive transmission signals from each other.

In some implementations, certain nodes 120 are parent or child nodes of other nodes 120. Generally, a first node 120 is considered a parent node 120 of a second node 120 if the first and second nodes 120 are neighbors and communications from the second node 120 to the PAN coordinator 115 or the headend system 130, or from the PAN coordinator 115 or the headend system 130 to the second node 120, are passed through the first node 120. Thus, the parent node 120 communicatively connects the child node 120 to the PAN coordinator 115. For instance, in the example of FIG. 1, Node B-1 is the PAN coordinator 115 of PAN B and is a parent node 120 to Node B-2, which is therefore a child node 120 to Node B-1. Analogously, Node A-6 is a child node 120 to Node A-5, which is a child node 120 to Node A-4, which is a child node 120 to Node A-1, which is the PAN coordinator 115 of PAN A. As described in more detail below, these relationships between nodes 120 of a PAN 110 can play a role in migration between PANs 110.

According to some implementations, migration can involve a subject node 120 leaving a first PAN 110 and joining a second PAN 110, also referred to a destination PAN 110. Various techniques exist for enabling a subject node 120 to join a PAN 110, such as a destination PAN 110, and one or more of such techniques may be used in implementations described herein. For instance, to join a PAN 110, a subject node listens for a beacon 140. A beacon 140 is an administrative packet distributed throughout the wireless mesh network 100 for administrative purposes, such as to maintain channel synchronization among radios of the nodes 120. In some implementations, upon receiving a beacon 140 from a PAN 110, the subject node 120 initiates a join process by sending a join request, which may involve advertising itself to the node 120 from which the subject node 120 received the beacon 140. The subject node 120 may then authenticate itself to the other node 120 and perform an association process, such as by providing information about itself that the other node 120. The other node 120 then passes the provided information to the PAN coordinator 115, which stores the information in its node data. In some implementations, the completion of these tasks causes the subject node 120 to become a part of the PAN 110. Other techniques for joining a PAN 110 are also possible and are within the scope of this disclosure.

As described above, a subject node 120 of the wireless mesh network 100 can migrate from a first PAN 110, which is its current PAN 110 at the beginning of the migration, to a second PAN 110. In some implementations, a subject node initiates migration upon detecting that a second instability factor associated with the second PAN 110 is sufficiently better than a first instability factor associated with the first PAN to which the subject node 120 currently belongs. For instance, the instability factor may be a numerical value computed by the subject node 120 deciding whether to migrate. In that case, if the first instability factor of the first PAN differs from the second instability factor of the second PAN by more than a margin (e.g., a predetermined value greater than zero), and if the second instability factor indicates improved stability over the first PAN 110, then the subject node 120 may initiate migration to the second PAN 110.

Thus, for determining whether to migrate, subject node 120 may be configured to compute instability factors. In some implementations, an instability factor of a PAN 110 is based on one or more of the following factors: routing cost, link quality, number of nodes in the PAN 110, or historical data (e.g., packet success rate) of the PAN 110. For instance, the subject node 120 may compute the instability factor as a function of one or more (e.g., all) of these factors. In some implementations, a high instability factor indicates high instability or high likelihood of instability and thus low stability or low likelihood of stability. In that case, the instability factor may be positively correlated with routing cost and number of nodes 120 and negatively correlated with link quality and packet success rate. Alternatively, in other implementations, if a high instability factor indicates low instability or low likelihood of instability, and thus high stability or high likelihood of stability, the instability factor may be negatively correlated with routing cost and number of nodes 120 and positively correlated with link quality and packet success rate. Various implementations are possible and are within the scope of this disclosure. Throughout portions of this disclosure, it is assumed that a high instability factor indicates high instability and thus low stability, but it will be understood that the reverse may be true.

Various techniques and metrics exist in the art for measuring and expressing routing cost, link quality, and number of nodes 120, and one or more of such techniques metrics may be used. For instance, routing cost can be defined as the number of hops to reach a specific other node in the PAN 110, such as the PAN coordinator 115; as the average number of hops to reach other nodes in the PAN 110; or as the latency in sending a message to the PAN coordinator 115 and receiving a response back from the PAN coordinator 115. For instance, link quality can be defined as the strongest signal strength (e.g., in decibels) of nodes 120 in the PAN 110 that are neighboring nodes 120 to the subject node 120, or link quality can be defined as the average signal strength to such neighboring nodes 120. In some implementations, the PAN coordinator 115 maintains node data about nodes 120 in the PAN 110 and may provide to the subject node 120 the number of nodes 120 in the PAN 110. For example, the PAN coordinator 115 provides this information to the subject node 120 on demand or periodically, such as through inclusion in the beacon 140.

Additionally or alternatively to the above, the subject node 120 may consider historical data about a PAN 110 when determining an instability factor for that PAN 110. For instance, that historical data may be a packet success rate within the PAN 110. Various techniques exist in the art for determining packet success rate, and one or more of such techniques may be used. In some implementations, the subject node 120 may maintain in its local storage historical data describing packet success for communications in which the subject node 120 is involved. For instance, for each data packet the subject node 120 sends and does not receive an expected acknowledgment, the subject node 120 may consider that a failure, and for each data packet the subject node 120 sends and does receive an expected acknowledgment, the subject node 120 may consider that a success. The subject node 120 may maintain an indication of such successes and failures so as to determine the packet success rate for the purpose of computing an instability factor.

In some implementations, even after migrating between PANs 110, a subject node 120 may maintain an indication of the packet success rate for one or more PANs 110 to which the subject node 120 no longer belongs, so as to utilize that packet success rate when determining the instability factor of a PAN 110 other than the one to which the subject node 120 currently belongs. Additionally or alternatively, in some implementations, nearby nodes 120 from other PANs with signals that can reach the subject node 120 may communicate (e.g., in their beacons 140) indications of their own packet success rates. This can provide the subject node 120 with additional historical data to use when computing an instability factor for a PAN 110 other than the one to which the subject node 120 currently belongs.

In some implementations, a subject node 120 computes an instability factor of a PAN 110 as a function of routing cost, link quality, number of nodes in the PAN 110, and packet success rate. Specifically, for instance, the subject node 120 can compute the instability factor I as follows:

$$I = \alpha C + \frac{1}{\beta}L + \gamma N + \frac{1}{\delta}R$$

In the above, C, L, N, and R are respectively the routing cost, link quality, number of nodes in the PAN 110, and packet success rate in the PAN 110; and $\alpha$, $\beta$, $\gamma$, and $\delta$ are respective weights for the routing cost, link quality, number of nodes in the PAN 110, and packet success rate. The subject node 120 may maintain respective values of the weights internally for use as needed. In some implementations, the weights may be determined and adjusted as needed based on the importance imputed (e.g., by an administrator) to each factor of the instability factor, and in some implementations, the respective values of the weights may be based on the classification (e.g., battery operated, critical, or normal) of the subject node 120. In some implementations, the values of the weights are fixed for a given PAN 110, but additionally or alternatively, the respective values of the weights may vary per node 120 or per PAN 110.

In some implementations, a subject node 120 computes a first instability factor for a first PAN 110 to which a subject node 120 belongs and a second instability factor for a second PAN 110 to which the subject node 120 does not belong, and the subject node 120 compares the two instability factors when determining whether to migrate from the first PAN 110 to the second PAN 110. For instance, if the subject node 120 determines that second instability factor is lower than the first instability factor (i.e., indicating less instability and more stability) by more than a margin, then the subject node 120 may initiate migration from the first PAN 110 to the second PAN 110.

In some cases, constant migration of nodes 120 between PANs 110 in the wireless mesh network 100 can lead to overall instability. Thus, in some implementations, a subject node 120 initiates migration only after migration criteria are met. The migration criteria can be deemed met when (a) a waiting period has passed since the subject node's last migration and (b) the second instability factor of a second PAN 110 other than the subject node's current PAN 110 is sufficiently better than (e.g., lower) the first instability factor of the subject node's current PAN 110 by at least a margin. Thus, in some implementations, the subject node 120 does not migrate between PANs 110 within the waiting period (e.g., one day) after its last migration between PANs 110. After a migration, the subject node 120 may stay in its new PAN 110 for a time at least equal to the waiting period. After the waiting period, the subject node 120 may compute respective instability factors for one or more other PANs 110 from which the subject node 120 receives beacons 140 due to being within signal reach. For each such instability factor computed for a different PAN 110, the subject node 120 may compare that instability factor to the instability factor computed for the current PAN 110 to determine whether to initiate migration.

In some implementations, a subject node 120 modifies its migration criteria upon receiving a migration demand from a child node 120 of the subject node 120. For instance, a migration demand is a request from a child node 120 for the subject node 120 to migrate so that the child node 120 can migrate along with the subject node 120 while maintaining the subject node 120 as its parent. A child node 120 can demand migration to improve its own connectivity within the wireless mesh network 100. In some implementations, only nodes 120 meeting certain criteria can demand migration of a parent node 120 and have that demand modify the migration criteria of the parent node 120. For instance, if a node 120 that is critical node 120 or battery-operated node 120 has only one neighbor, which would be its parent node 120 in that case, and if the node 120 has computed an instability factor for the current PAN 110 that meets an instability threshold (e.g., is greater than or equal to the insufficient instability threshold), then the node 120 can send a demand to its parent to migrate to another PAN 110. In some implementations, the instability threshold can vary based on the classification of the node 120.

Upon receipt of such demand, the parent node 120 can modify its migration criteria in selecting a destination PAN 110 to which to migrate. For instance, the parent node 120 can terminate the waiting period, thus enabling sooner migration, and the parent node 120 can modify (e.g., lower) its margin used to determine whether another PAN's instability factor indicates a sufficiently improved level of stability. These modifications to the migration criteria can enable the parent node 120 to select a destination PAN 110 that might not have otherwise been deemed sufficiently stable for a migration destination. After finding and selecting the destination PAN 110, the parent node 120 may inform the child node 120 of a PAN identifier (ID) of the destination PAN 110. The child node 120 can then take appropriate action to migrate to the destination PAN 110 along with the parent node 120. For instance, the child node 120 may utilize a hard migration mode or a soft migration mode to migrate to the destination PAN 110.

Upon deciding to migrate (i.e., the migration criteria have been met), regardless of whether the migration was prompted by a demand from a child node 120, a subject node 120 may select a migration mode to use during the migration. In some implementations, a subject node 120 is capable of two or more migration modes, such as a hard migration mode and a soft migration mode, or the subject node 120 may be capable of only one migration mode or the other. Generally, the hard migration mode may result in a more abrupt switch between PANs 110 as compared to the soft migration mode. The details of each migration mode are described in more detail later in this disclosure.

Example of Migration Modes and Selecting Between Migration Modes

Figure 2:
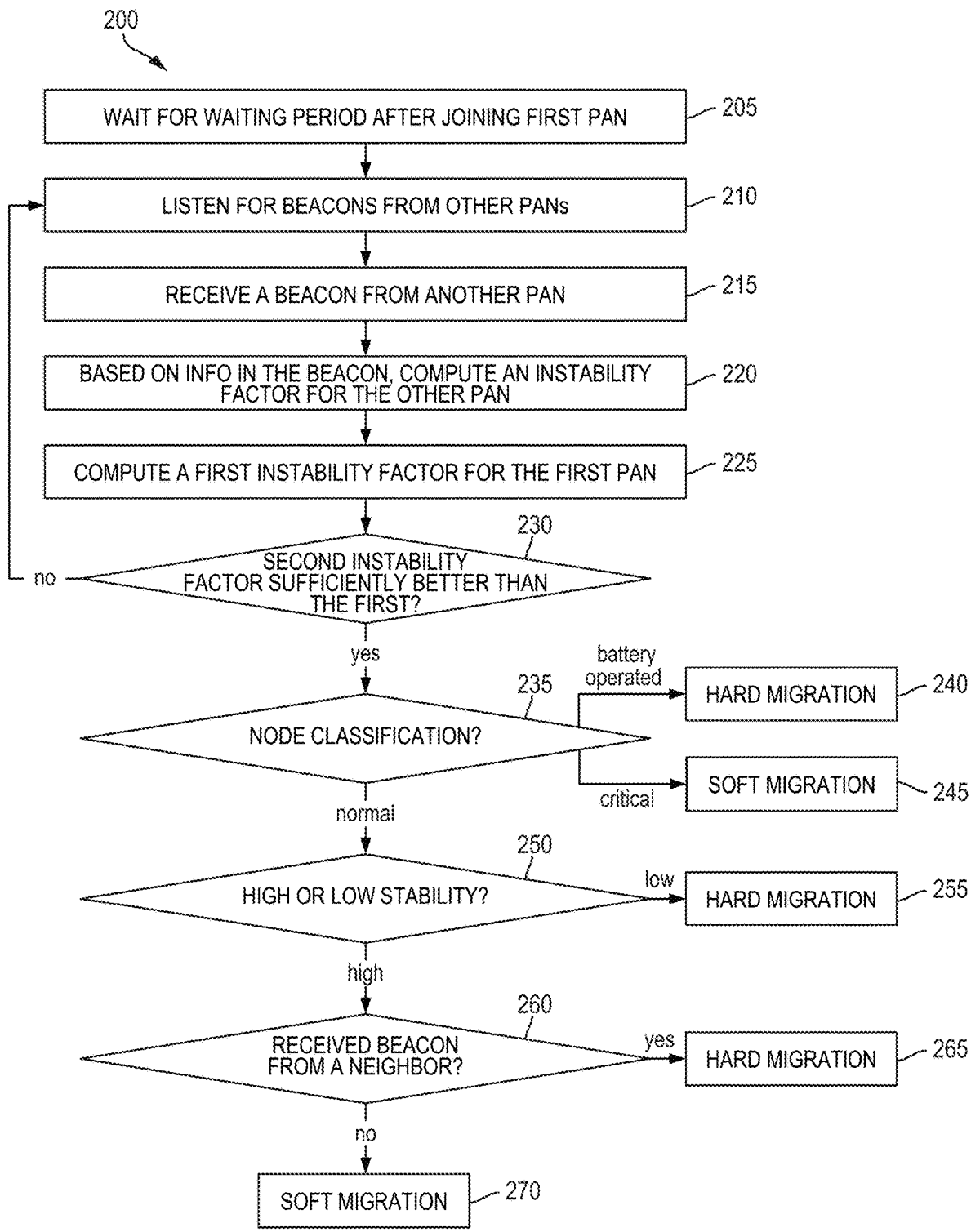
FIG. 2 is a flow diagram of a method for determining whether to migrate and, if so, selecting a migration mode, according to some implementations described here.

FIG. 2 is a flow diagram of a method 200 for determining whether to migrate and, if so, selecting a migration mode, according to some implementations described here. The method 200 depicted in FIG. 2 may be implemented in software, hardware, or a combination of software and hardware. The method 200 presented in FIG. 2 and described below is intended to be illustrative and non-limiting. Although FIG. 2 depicts various processing operations occurring in a particular sequence or order, this is not intended to be limiting. In certain alternative examples, the processing may be performed in a different order, operations may be excluded or added, or some operations may be performed in parallel. In some implementations, a subject node 120 performs this method 200 or similar in determining whether and how to migrate between PANs 110.

As shown in FIG. 2, at block 205, a subject node 120 that is part of a first PAN 110 waits for a waiting period to end, where that waiting period began at the time the subject node 120 joined the first PAN 110 via migration or otherwise. During this waiting period, the subject node 120 need not compute its instability factor or the respective instability factors of other PANs 110. In some implementations, if the subject node 120 receives a beacon 140 from another PAN 110 during the waiting period, the subject node 120 need not use information in that beacon 140 to compute an instability factor for the other PAN 110. For the purposes of PAN migration, the subject node 120 can ignore the beacon 140. As described above, however, if the subject node receives a migration demand from a child node 120, the waiting period may be terminated early or, in other words, may be shortened to a term of zero.

Eventually, the waiting period ends. For instance, the waiting period could end due to the entire original time length of the waiting period having passed, or the waiting period could end due to the subject node 120 receiving a migration demand from a child node 120. After the waiting period, at block 210, the subject node 120 considers beacons from other PANs 110 for potential migration.

At block 215, the subject node 120 receives a beacon 140 from another PAN 110, other than the first PAN 110. At block 220, the subject node 120 computes an instability factor for the other PAN 110 based on information in the beacon 140 and, in some examples, based on information maintained by the subject node 120 itself. For instance, the subject node 120 computes the instability factor of the other PAN 110 as a function of the route cost of the other PAN 110, link quality between the subject node 120 and the node 120 from which the beacon 140 was received, number of nodes 120 in the other PAN 110, and packet success rate of the other PAN 110. In some implementations, the route cost and the number of nodes 120 may be included in the beacon 140, and the subject node 120 may determine the link quality based on the signal strength of the signal of the node 120 from which the beacon 140 was received. As described above, the packet success rate can be based on data maintained by the subject node 120 or can be based on data included in the beacon 140 or otherwise received from the node 120 from which the beacon 140 was received.

At block 225, the subject node 120 computes a first instability factor for the first PAN 110, which is the PAN 110 to which the subject node 120 currently belongs. For instance, as described above, the subject node 120 computes the instability factor of the first PAN 110 as a function of the route cost of the first PAN 110, the link quality between the subject node 120 and one or more other nodes 120 in the first PAN 110, the number of nodes 120 in the first PAN 110, and the packet success rate of the first PAN 110 as maintained by the subject node 120. Although this block 225 is shown in FIG. 2 as occurring after block 220, the subject node 120 can compute the instability factor of the first PAN 110 at various points in this method 200. For instance, the subject node 120 could compute the first instability factor each time it receives a beacon 140 for the first PAN 110, or the subject node 120 could compute the first instability factor at the expiration of the waiting period. Additionally or alternatively, the subject node 120 could compute the first instability factor each time the subject node 120 computes the instability factor for another PAN 110 being considered as a destination PAN 110.

At decision block 230, the subject node 120 determines whether the instability factor for the other PAN 110, as computed at block 220, is sufficiently better than the first instability factor, as computed at block 225. As described above, the instability factor of the other PAN 110 can be deemed sufficiently better than the first instability factor if the instability factor of the other PAN 110 is lower than the first instability factor by at least a predetermined margin.

If the instability factor of the other PAN 110 is not sufficiently better than the first instability factor, then the method 200 returns to block 210 to listen for additional beacons 140 from PANs 110 other than the first PAN 110. Because the instability factor of a PAN 110 may change over time, the subject node 120 may later reconsider a PAN 110 that has already been considered as a destination PAN 110, and the subject node 120 may additionally or alternatively consider PANs 110 that have not yet been considered. However, if the instability factor of the other PAN 110 is deemed sufficiently better than the first instability factor at decision block 230, then the method 200 may proceed to decision block 235 to determine a migration mode for migrating to the other PAN 110, which is now the destination PAN 110.

In some implementations, the migration mode is based on one or more of the following: the node classification of the subject node 120, the first instability factor of the first PAN 110, or whether a beacon 140 was recently received (e.g., within a predefined short range of time) from a neighboring node 120 of the destination PAN 110. Below is a non-limiting example of a technique used to select a migration mode.

At decision block 235, the subject node 120 determines its own classification (e.g., critical, battery operated, or normal). In some implementations, each node 120 is programmed with an indication of its classification, and thus, the subject node can simply check this indication to determine its classification. If the subject node 120 is battery operated, then at block 240, the subject node 120 initiates migration using the hard migration mode. However, if the subject node 120 is critical, then at block 245, the subject node 120 initiates migration using the soft migration mode. If the subject node 120 is normal, then the method 200 proceeds to decision block 250.

At decision block 250, the subject node 120 has determined it is a normal node 120, and as such, the subject node 120 further determines whether its network stability is high or low. In cases where a high instability factor indicates a lack of stability, then this can equate to determining whether the first instability factor is below or above a mode threshold. If the stability of the first PAN 110 is low (e.g., the first instability factor is above the mode threshold), then the subject node 120 initiates migration using the hard migration mode at block 255. However, if the stability of the first PAN 110 is high (e.g., the first instability factor is below the mode threshold), then at decision block 260, the subject node 120 determines whether it received a beacon 140 for the destination PAN 110 from a neighboring node 120 in the destination PAN 110. The receipt of a beacon 140 from a neighboring node 120 is an indication of existing trust between the subject node 120 and a device within the destination PAN 110. If the beacon 140 was received, then the subject node 120 initiates migration using the hard migration mode at block 265. Otherwise, the subject node 120 initiates migration using the soft migration mode at block 270.

As described above, a subject node 120 may be capable of hard migration (i.e., using the hard migration mode), soft migration (i.e., using the soft migration mode), or both. For instance, a node 120 that is a battery-operated node 120 may be capable of only hard migration, a node 120 that is a critical node 120 may be capable of only soft migration mode, and a node 120 that is a normal mode may be capable of both hard migration and soft migration and may thus select from between the two modes when migrating.

Example of Hard Migration

As mentioned above, in some implementations, the hard migration mode is more abrupt than the soft migration mode. Specifically, at some point, a subject node 120 migrating from a first PAN 110 to a second PAN 110 via hard migration may simply stop participating in the first PAN 110 and then join the second PAN 110. This can conserve resources of the subject node 120 but may result in a brief period during which the subject node 120 is not a full participant in any PAN 110 in the wireless mesh network 100. In contrast, soft migration can involve a gradual shift in which the subject node 120 may participate in both the first PAN 110 and the second PAN 110, in some respects, for a short period to facilitate continuous or near-continuous connectedness. Hard migration can be beneficial for battery-operated nodes 120, which need to conserve energy, as well as normal nodes 120 detecting particularly low stability in the first PAN 110, such that little benefit would be gained from staying in the first PAN 110 during a gradual shift.

In some implementations, hard migration involves a notification period. To initiate hard migration from a first PAN 110 to a second PAN 110, a subject node 120 may broadcast a migration notification message indicating an expiration time for that notification period. For instance, the expiration time can be indicated as a timestamp or as a timeout relative to the time of sending the migration notification message. The expiration time may define when the subject node 120 begins its actual exit from the first PAN 110 and sends a join request to the second PAN 110. During the notification period, the subject node 120 may consider objections to its choice to migrate.

In some implementations, the migration notification message notifies neighboring nodes 120, including child nodes 120, of the subject node's decision to migrate. Due to this notification, child nodes 120 and other neighboring nodes 120 can determine how to respond to the potential migration. For instance, a child node 120 of the subject node 120 can begin searching for a new parent node 120 in the first PAN 110 or in a different PAN 110. Additionally or alternatively, each node 120 may maintain a neighbor list identifying its neighboring nodes, and responsive to receiving the migration notification message, the neighboring nodes 120 of the subject node 120 can begin updating their respective neighbor lists to exclude the subject node 120.

In some implementations, a neighboring node 120 can object to the migration of the subject node 120 if such objection is based on one or more of predetermined reasons, and such an objection is effectively a request for the subject node 120 to remain in the first PAN 110. For one example, if a child node 120 of the subject node 120 cannot reach (i.e., via radio signal) any potential new parent node 120 in the first PAN 110 or in another PAN 110, then the child node 120 may object to the migration. For another example, if a child node 120 is involved in a critical task, such as if the child node 120 is a critical node 120 or if the child node 120 is in the middle of a firmware download, such that the firmware download that would need to restart or for which packets of the firmware download would be dropped if the child node 120 was required to find a new parent, then the child node 120 may object to the migration. If the child node 120 objects to the migration, then the child node 120 may transmit to the subject node 120 a negative acknowledgement (NACK) message indicating the objection and the reason for the objection. If the child node 120 has no objection, however, the child node 120 can, but need not, send an acknowledgment (ACK) message back to the subject node 120.

If the subject node 120 does not receive any objections (e.g., as expressed in NACK messages) from neighboring nodes 120 before the expiration time, then the subject node 120 may proceed with the hard migration as described below. However, if the subject node 120 receives ones or more objections, then the subject node 120 may decide whether to terminate the hard migration. In some implementations, the subject node 120 applies a set of rules to determine whether to terminate the hard migration based on objections received. The rules may encode a set of priorities for the node. For instance, if the subject node 120 received an objection from a child node 120 that cannot find a new parent node 120 in the first PAN 110 or in another PAN 110, then the subject node 120 may terminate the hard migration prior to actually leaving the first PAN 110 or joining the second PAN 110. In that case, the lack of another suitable parent for the child node 120 takes higher priority than the improved stability that the subject node 120 would experience through migration. Additionally or alternatively, if the subject node 120 receives objections from a predetermined percentage (e.g., 75%) of child nodes 120, then the subject node 120 may terminate the hard migration prior to leaving the first PAN 110 or joining the second PAN 110. In that case, the high objection rate is assigned a higher priority than the improved stability that the subject node 120 would experience through migration. If the subject node 120 terminates the hard migration, then soft migration may still be an option, as described below.

However, if the subject node 120 is facing maximum packet drops, such as in a case where the instability factor of the first PAN 110 is above the mode threshold, then the subject node 120 may decide to proceed with hard migration regardless of objections. In that case, regardless of the reasons for the objections, the subject node 120 may be unable to reliably provide communication routing or other services to its neighboring nodes 120 within the first PAN 110. In that case, the high risk of packet drops in the current state takes priority over objections from other nodes 120. As such, terminating migration would not have a substantial benefit, and the subject node 120 may thus proceed with the hard migration.

If the subject node 120 terminates the hard migration due to one or more objections received from neighboring nodes 120, then the subject node 120 may transmit a termination notification message to each neighboring node 120 that objected to the migration. For instance, the subject node 120 may send a unicast message to each such neighboring node 120 to indicate that hard migration is terminated, or the subject node 120 may broadcast a message to inform nearby nodes 120 that the hard migration is terminated.

Example of Soft Migration

In some implementations, soft migration is more gradual than hard migration, in that activities involved in leaving a first PAN 110 and joining a second PAN 110 start at an earlier point in the migration process. At some point, a subject node 120 migrating from the first PAN 110 to the second PAN 110 via soft migration may be associated with, and possibly participating in, both the first PAN 110 and the second PAN 110 in some respects. In contrast to hard migration, soft migration can ensure that the subject node 120 remains connected to other nodes 120 in the wireless mesh network 100 throughout the migration process. Soft migration can be beneficial in particular (a) for a critical node 120 acting as the subject node 120 or (b) for a subject node 120 that is the parent of one or more critical nodes 120 or the parent of one or more nodes 120 performing critical tasks, such as a firmware download. Soft migration can also benefit normal nodes 120 in cases where the first PAN 110 has high stability (e.g., a low instability factor) because services to or from the normal node 120 can potentially proceed more smoothly during soft migration, and power need not be conserved as with a battery-operated node 120.

In some implementations, soft migration involves a notification period. The notification period may, but need not, be shorter than the notification period used during hard migration. To initiate soft migration from a first PAN 110 to a second PAN 110, the subject node 120 may broadcast a migration notification message indicating an expiration time for the notification period. For instance, the expiration time can be indicated as a timestamp or as a timeout length. The expiration time may define when the subject node 120 stops providing services (e.g., routing communications) for the first PAN 110 and removes neighboring nodes 120 in the first PAN 110 from its neighbor list. During the notification period, the subject node 120 may consider objections to its choice to migrate from the first PAN 110 to the second PAN 110.

In some implementations, the migration notification message notifies neighboring nodes 120, including child nodes 120, of the subject node's decision to migrate. Due to this notification, child nodes 120 and other neighboring nodes 120 can determine how to respond to the potential migration. For instance, a child node 120 of the subject node 120 can begin searching for a new parent node 120 in the first PAN 110 or in a different PAN 110. Additionally or alternatively, neighboring nodes 120 can begin updating their respective neighbor lists of their own neighboring nodes 120 to exclude the subject node 120.

In some implementations, a neighboring node 120 can object to the migration of the subject node 120 if such objection is based on one or more of a set of predetermined reasons, and such an objection is effectively a request for the subject node 120 to remain in the first PAN 110. For one example, if a child node 120 of the subject node 120 cannot reach (e.g., via radio signal) a potential new parent node 120 in the first PAN 110 or in another PAN 110, then the child node 120 may object to the migration. For another example, if a child node 120 is involved in a critical task, such as if the child node 120 is a critical node 120 or if the child node 120 is in the middle of a firmware download, then the child node 120 may object to the migration. If the child node 120 objects to the migration, then the child node 120 may transmit to the subject node 120 a NACK message indicating the objection and the reason for the objection. If the child node 120 has no objection, then the child node 120 can, but need not, send an ACK message back to the subject node 120. In some implementations, the possible reasons for objecting can be the same or similar to those used during hard migration, as described above.

In some implementations, the subject node 120 also sends a coordinator notification message to the PAN coordinator of the first PAN 110, indicating the expiration time. In contrast, during hard migration, no notification message need be sent to the PAN coordinator 115. During the notification period, the PAN coordinator 115 may determine the effect that the migration of the subject node 120 will have on the PAN 110. As discussed above, the PAN coordinator 115 can maintain an indication of the mesh tree of nodes 120 in the PAN 110. The PAN coordinator 115 may thus check the position of the subject node 120 within the mesh tree and identify the subtree having the subject node 120 as its root. During the notification period, the PAN coordinator 115 may send a subtree notification message to the nodes 120 in that subtree. The nodes 120 in the subtree may be direct and indirect child nodes 120 of the subject node 120 and may thus be impacted by the subject node's migration away from the first PAN 110. Without the subtree notification message, some of these nodes 120 that are not neighboring nodes 120 of the subject node 120 might be left without information about the migration and might later suffer communication delays if the migration completes. As a result of the subtree notification message, however, these nodes 120 can begin searching for a new parent node 120 within the first PAN 110 or in another PAN 110 of the wireless mesh network 100.

Additionally or alternatively to the above, the PAN coordinator 115 may object to the migration of the subject node 120, and such an objection is effectively a request for the subject node 120 to remain in the first PAN 110. For instance, the PAN coordinator 115 could determine from its analysis of the mesh tree of the PAN 110 that losing the subject node 120 would negatively impact the stability of the PAN 110. For example, the PAN coordinator can make this determination if the PAN coordinator 115 determines that one or more critical nodes 120 would no longer have a reliable communication route to the PAN coordinator 115 without the subject node 120 involved. For another example, the PAN coordinator 115 can compute a current instability factor for the first PAN 110 as well as an anticipated instability factor for the first PAN 110 without the subject node 120. If the anticipated instability factor indicates reduced stability as compared to the current instability factor or if the anticipated instability factor meets a threshold (e.g., is higher than a threshold), then the PAN coordinator 115 may conclude that migration of the subject node 120 would negatively impact the stability of the first PAN 110. If the PAN coordinator 115 determines that the migration would indeed negatively impact the stability of the first PAN 110, then the PAN coordinator 115 may object to the migration by sending a coordinator NACK message to the subject node 120. The coordinator NACK message may indicate a reason for the PAN coordinator's objection to the migration.

In some implementations, the subject node 120 decides for itself whether to proceed with the migration. To make this decision, the subject node 120 may apply a set of rules to the subject node's current situation, including, for instance, the first instability factor or any objections received. For instance, if the subject node 120 received an objection from a child node 120 that cannot find a new parent node 120, then the subject node 120 may terminate the soft migration. Additionally or alternatively, if the subject node 120 received objections from a predetermined percentage (e.g., 50%) of child nodes for other reasons, such as being critical nodes 120 or being involved in critical tasks, then the subject node 120 may terminate the soft migration. Additionally or alternatively, if the subject node 120 received a coordinator NACK message from the PAN coordinator 115, the subject node 120 may give great weight to that coordinator NACK message and may, for instance, delay or terminate the soft migration.

However, if the subject node is facing maximum packet drops, such as in a case where the instability factor of the first PAN 110 is above a mode threshold, the subject node 120 may decide to proceed with soft migration regardless of objections. In that case, regardless of the reasons for the objections, the subject node 120 may be unable to reliably provide communication routing or other services to its neighboring nodes 120 within the first PAN 110.

If the subject node 120 opts to terminate the soft migration, then the subject node 120 may transmit a coordinator termination notification message to the PAN coordinator 115. Additionally or alternatively, the subject node 120 may send a termination notification message to each neighboring node 120 that objected to the migration. For instance, the subject node 120 may send a unicast message to each such neighboring node 120 to indicate that soft migration is terminated. In some implementations, when terminating soft migration, the subject node 120 may terminate the joining process for joining the second PAN 110 if that joining process has already begun, and the subject node 120 may remove indications of any nodes 120 in the second PAN 110 that have already been added to its neighbor list in anticipation of the migration. After terminating the soft migration, the PAN 110 may postpone any further migration attempts, such as for a predetermined period.

In some implementations, messages transmitted between the subject node 120 and neighboring nodes 120 to facilitate either hard or soft migration are Media Access Control (MAC) layer messages. For instance, messages sent via the MAC layer to facilitate migration can include one or more of the following: the migration notification message, the ACK message, the NACK messages, the migration termination message, and the message from a child node 120 demanding migration of a parent. Below, TABLE 1 illustrates an example format of a MAC layer message that can be used for each of such messages between neighboring nodes 120 as described herein:

TABLE 1

| Octet 1 | Bits 0-2 | Migration type |
|---|---|---|
|  | Bit 3 | Current PAN ID |
|  | Bit 4 | Reason |
|  | Bit 5 | Acknowledgment |
|  | Bit 6 | ACK/NACK |
|  | Bit 7 | Reserved |
| Octets 2-3 | Bits 0-15 | Expiration Time |
| Octets 4-5 | Bits 0-15 | New Pan ID |
| Octet 6 | Bits 0-15 | Reason Flags |

In some implementations, if the MAC layer message is a migration notification message, Bits 0-2 of Octet 1 of the MAC layer message are set to a value other than 000, and if the MAC layer message is a termination notification message, the value of Octet 1 is 000. TABLE 2 below illustrates an example of the meanings of various possible values of the bits in Octet 1:

TABLE 2

| 000 | Migration is terminated |
|---|---|
| 001 | Soft migration; notification period not yet expired |
| 010 | Hard migration; notification period not yet expired |
| 011 | Soft migration; notification period has expired |
| 100 | Hard migration; notification period has expired |
| 101 | Migration demand to parent |
| 110 | Migration demand from child |

In some implementations, the following additional indications are used in a MAC layer message: Bit 3 of Octet 1 is a Boolean variable indicating validity of (i.e., inclusion of) the PAN ID in Octets 4-5; Bit 4 of Octet 1 is a Boolean variable indicating whether a reason flag in Octet 6 is valid; Bit 5 indicates whether Bit 6 is valid, and if so, Bit 6 is a Boolean variable indicating whether the MAC layer message is an ACK message or alternatively a NACK message; and Bit 7 is reserved for future use or can be used for some other purpose. In some implementations, Octets 2-3 are valid if Bit 5 is not set, and in that case, Octets 2-3 indicate an expiration time of a notification period. Octets 4-5 may be used to inform a child node 120 of the PAN ID of a destination PAN 110, and Octets 4-5 may be used to respond to a child node 120 that has demanded migration so as to inform the child node 120 of the destination PAN 110. Octet 6 may be used for reason flags, such as to indicate a reason for objecting to migration by a neighboring node 120.

In some implementations, MAC layer messages between a subject node 120 and its PAN coordinator 115 or between other nodes 120 and the PAN coordinator 115 may take a different format than described above. These messages may include the coordinator notification message, the subtree notification message, the coordinator ACK message, the coordinator NACK message, and the coordinator termination notification message. TABLE 3 below indicates an example format of these MAC layer messages:

TABLE 3

| Octet 1 | Bits 0-2 | Migration type |
|---|---|---|
|  | Bit 3 | Boolean for validity of subject node address |
|  | Bit 4 | Boolean indicating whether a short address or long address is provided for the subject node |
|  | Bits 5-7 | Reserved |
| Octets 2-8 | All Bits | Short or long address of subject node |

In some implementations, the migration type in Bits 0-2 of Octet 1 can be defined as provided in TABLE 2; Bit 3 of Octet 1 indicates whether Octets 2-8 are valid; Bit 4 of Octet 1 indicates whether Octets 2-8, if valid, indicate a short address or long address for the subject node 120; and Bits 5-7 of Octet 1 are reserved or used for some other purpose. Octets 2-8 may indicate an address of the subject node 120. In some implementations, either a short address or a long address may be used; for instance, a long address may be used if the wireless mesh network 100 is large enough that use of long addresses may be needed to ensure the uniqueness of addresses.

Example Method for Implementing Hard Migration

Figure 3:
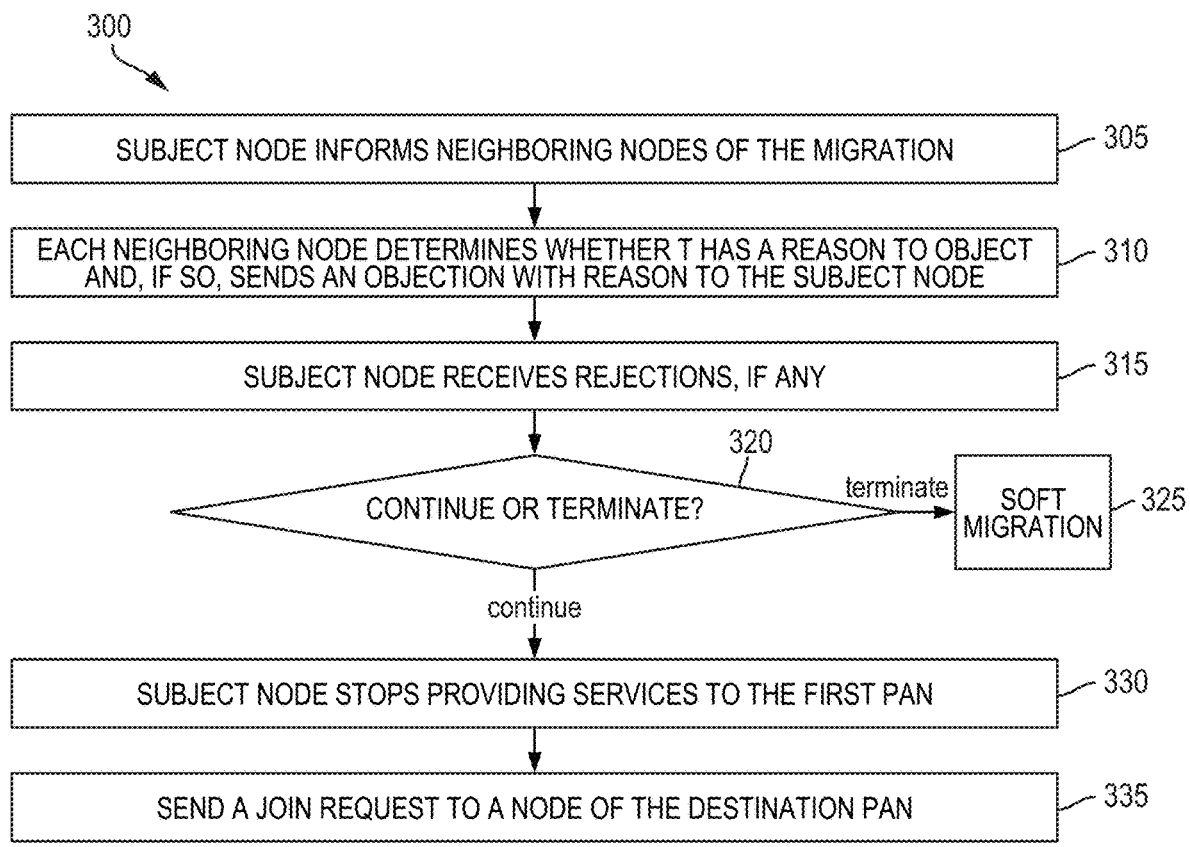
FIG. 3 is a flow diagram of a method for performing hard migration, according to some implementations described herein.

FIG. 3 is a flow diagram of a method 300 for performing hard migration, according to some implementations described herein. The method 300 depicted in FIG. 3 may be implemented in software executed by one or more processors of a computer system, implemented in hardware, or implemented in a combination of software and hardware. The method 300 presented in FIG. 3 and described below is intended to be illustrative and non-limiting. Although FIG. 3 depicts various processing operations occurring in a particular sequence or order, this is not intended to be limiting. In certain alternative examples, the processing may be performed in a different order, operations may be excluded or added, or some operations may be performed in parallel. In some implementations, a subject node 120 may perform the method 300 of FIG. 3, or a similar method, responsive to deciding to migrate to a destination PAN 110 by way of hard migration.

Prior to the beginning of this method 300, a subject node 120 has selected a destination PAN 110 to which to migrate from a first PAN 110, and the subject node 120 has selected hard migration as the migration mode for this particular migration. As shown in FIG. 3, at block 305, the subject node 120 informs its neighboring nodes 120 of the migration, such as by broadcasting a migration notification message. In some implementations, the migration notification message indicates an expiration time for a notification period. Further, in some implementations, the subject node 120 does not yet initiate leaving the first PAN 110 or joining the destination PAN 110.

At block 310, after being informed of the migration, each neighboring node 120 of the subject node 120 determines whether it has a reason to object to the migration of the subject node 120. For instance, each neighboring node 120 may have a predetermined set of reasons that, if true, allow the neighboring node 120 to object to the migration. If one of such reasons is true, then the neighboring node 120 objects to the migration by transmitting to the subject node a negative acknowledgment message indicating the reason for the objection.

Thus, at block 315, the subject node 120 receives objections, if any have been made, sent by its neighboring nodes 120. At decision block 320, the subject node 120 decides whether to continue or terminate the hard migration. This decision may be based on the objections received or, more specifically, on the reasons indicated for such objections. Specifically, for instance, the subject node 120 applies a set of rules (i.e., conditions) to the objections to determine whether to terminate the migration.

If the subject node 120 decides to terminate the hard migration, then at block 325, the subject node 120 may attempt soft migration to the destination PAN 110 instead. In that case, the subject node 120 may execute the method 400 illustrated in FIG. 4 or similar to perform the soft migration. However, if the subject node 120 decides to continue with the hard migration, then at block 330 of the method 300, the subject node 120 stops providing services (e.g., routing communications) for the first PAN 110 and stops advertising the beacon 140 of the first node 120. At block 335, the subject node 120 sends a join request to a node 120 of the destination PAN 110 to initiate joining the destination PAN 110.

Example Method for Implementing Soft Migration

Figure 4:
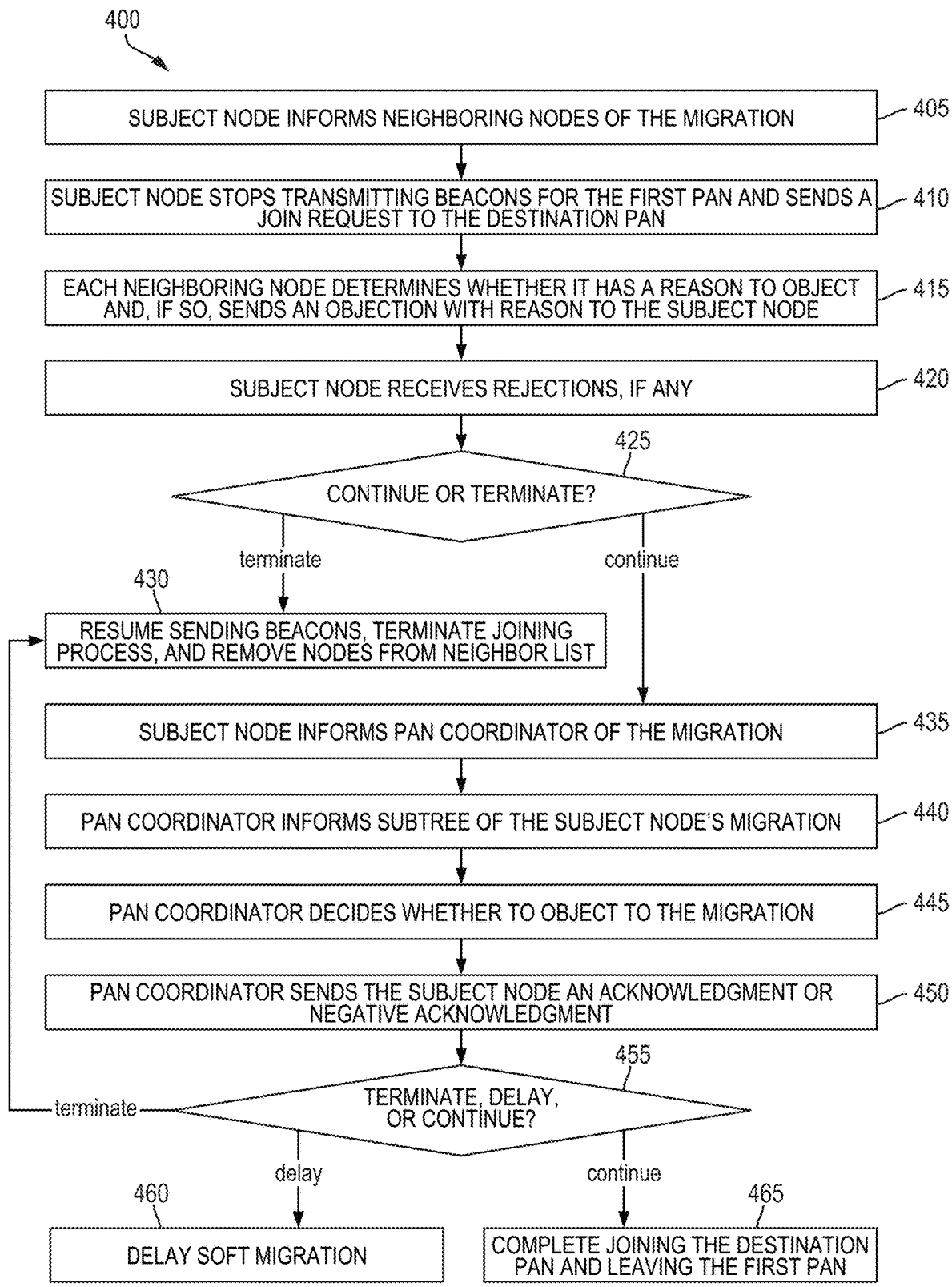
FIG. 4 is a flow diagram of a method for performing soft migration, according to some implementations described herein.

FIG. 4 is a flow diagram of a method 400 for performing soft migration, according to some implementations described herein. The method 400 depicted in FIG. 4 may be implemented in software executed by one or more processors of a computer system, implemented in hardware, or implemented in a combination of software and hardware. The method 400 presented in FIG. 4 and described below is intended to be illustrative and non-limiting. Although FIG. 4 depicts various processing operations occurring in a particular sequence or order, this is not intended to be limiting. In certain alternative examples, the processing may be performed in a different order, operations may be excluded or added, or some operations may be performed in parallel. In some implementations, a subject node 120 may perform the method 400 of FIG. 4, or a similar method, responsive to deciding to migrate to a destination PAN 110 by way of soft migration.

Prior to the beginning of this method 300, a subject node 120 has selected a destination PAN 110 to which to migrate from a first PAN 110, and the subject node 120 has selected soft migration as the migration mode for this particular migration. In some implementations, soft migration could have been selected after a failed hard migration, but alternatively, the subject node 120 could have initially determined that soft migration was appropriate in lieu of hard migration.

As shown in FIG. 4, at block 405, the subject node 120 informs its neighboring nodes 120 of the migration, such as by broadcasting a migration notification message. In some implementations, the migration notification message indicates an expiration time of a notification period. At block 410, without waiting for the expiration time to arrive, the subject node 120 stops transmitting beacons 140 and other administrative packets in the first PAN 110, and the subject node 120 sends a join request to the destination PAN 110, which begins the process of joining the destination PAN 110. However, the subject node 120 may continue servicing the first PAN 110, such as by routing communications to and from its direct and indirect child nodes 120. At this point, the subject node 120 is transitioning between the first PAN 110 and the destination PAN 110 but need not be a full participant in either. However, in some implementations, various activities can still occur during the soft migration that would cause the subject node 120 to terminate the soft migration.

Although not shown as a block in FIG. 4, if the process of joining the destination PAN 110 fails at any point in the method 400 for soft migration, then the soft migration as a whole fails, and the subject node 120 may therefore terminate the soft migration. Upon terminating the soft migration, the subject node 120 may resume transmitting beacons 140 and other administrative packets in the first PAN 110, and the subject node 120 may remove, from its list of neighboring nodes 120, any nodes 120 that have been added to the list during the soft migration from the destination PAN 110.

At block 415, after being informed of the migration, each neighboring node 120 of the subject node 120 determines whether it has a reason for objecting to the migration. For instance, each neighboring node 120 may have a predetermined set of reasons that, if true, allow the neighboring node 120 to object to the migration. If one of such reasons is true, then the neighboring node 120 may object to the migration by transmitting to the subject node 120 a NACK message, which can indicate a reason for the objection.

At block 420, the subject node 120 receives objections, if any, made by its neighboring nodes 120. At decision block 425, the subject node 120 decides whether to continue or terminate the soft migration. This decision may be based on the objections received or, more specifically, on the reasons indicated for such objections. In some implementations, for instance, the subject node 120 applies a set of rules (i.e., conditions) to the objections to determine whether to proceed with or terminate the soft migration. If the subject node 120 decides to terminate the soft migration, then at block 430, the subject node 120 may (1) resume advertising beacons 140 of the first PAN 110, terminate the joining process for joining the destination PAN 110, and remove indications of any nodes 120 in the second PAN 110 that have already been added to its neighbor list in anticipation of the migration. In some implementations, after terminating the soft migration, the PAN 110 may postpone any further migration attempts, such as for a predetermined period.

If the subject node 120 decides to continue with the soft migration, then at block 435, the subject node 120 informs a PAN coordinator 115 of the first PAN 110 about the migration, such as by transmitting a coordinator migration notification message to the PAN coordinator 115. At block 440, after being informed, the PAN coordinator 115 informs the subtree of the subject node 120 of the migration, such as by sending a subtree notification message to each direct and indirect child node 120 of the subject node 120, to ensure that these nodes 120 are aware of the potential migration. This can enable such nodes 120 to search for respective new parent nodes 120 if needed. In some implementations, the direct and indirect child nodes 120 can send NACK messages back to the PAN coordinator 115, if applicable. Additionally or alternatively, at block 445, the PAN coordinator 115 determines whether to object to the migration. For instance, the PAN coordinator 115 may object to the migration if the PAN coordinator 115 decides that the stability of the first PAN 110 would be negatively impacted by the subject node 120 leaving the first PAN 110. This determination may be informed, for instance, by on any NACK messages received by the PAN coordinator 115 or by the PAN coordinator's own analysis of the mesh tree of the PAN 110.

At block 450, the PAN coordinator 115 sends to the subject node 120 an indication of acknowledgment or an objection in the form of a negative acknowledgment. For instance, if the PAN coordinator 115 has no reason to object to the migration (e.g., if there is no substantial negative impact on PAN stability), then the PAN coordinator 115 may transmit a coordinator ACK message back to the subject node 120. The coordinator ACK message may have a format similar to that illustrated in TABLE 3 above. In that case, the PAN coordinator 115 may express its lack of objection by including in the MAC layer message the same migration type (i.e., soft migration) as indicated in the coordinator notification message send by the subject node 120 to the PAN coordinator 115. However, if the PAN coordinator 115 determines a reason to object to the migration, then the PAN coordinator 115 may transmit a coordinator NACK message back to the subject node 120. Like a coordinator ACK message, the coordinator NACK message may take the form of a MAC layer message as shown in TABLE 3. However, in the case of a coordinator NACK message, the migration type indicated may be different from the migration type indicated by the subject node 120 in the coordinator notification message, thus indicating a negative acknowledgment.

At decision block 455, upon receipt of feedback from the PAN coordinator 115 (e.g., either a coordinator ACK message or a coordinator NACK message, the subject node 120 decides whether to terminate, delay, or continue the soft migration. In some implementations, the PAN coordinator 115 has the ability to control nodes 120 of the PAN 110, including the subject node 120. Thus, the PAN coordinator 115 may be able to stop the migration or delay the migration, and in such implementations, the subject node 120 complies with any such request from the PAN coordinator 115. Additionally or alternatively, the subject node 120 may apply a set of rules to feedback from the PAN coordinator 115. If the PAN coordinator sent a NACK message indicating a reason that is temporary (e.g., one or more indirect child nodes 120 are not critical nodes 120 but are in the process of performing a critical task such as a firmware download), then the subject node 120 may delay completion of the soft migration at block 460. In that case, the subject node 120 may continue with the soft migration after an additional waiting period has passed. During this additional period, the subject node 120 may, but need not, resume sending beacons 140 for the first PAN 110 and terminate joining the destination PAN 110. In that case, the subject node 120 may once again stop transmitting the beacons 140 and initiate joining the destination PAN 110 after the additional waiting period. If the reason for the PAN coordinator's objection is not necessarily temporary (e.g., a critical node 120 would lose communication with the PAN coordinator 115 due to the migration, or the subject node 120 has multiple battery-operated nodes 120 as children), however, then the subject node 120 may terminate the soft migration, such as at block 430 of the illustrated method 400.

If the PAN coordinator 115 does not object to the migration, however, then at block 465, the subject node 120 completes the soft migration. To this end, the subject node 120 completes authentication and association with respect to the destination PAN 110 and stops performing services for the first PAN 110.

Example Computing System Acting as a Node

Figure 5:
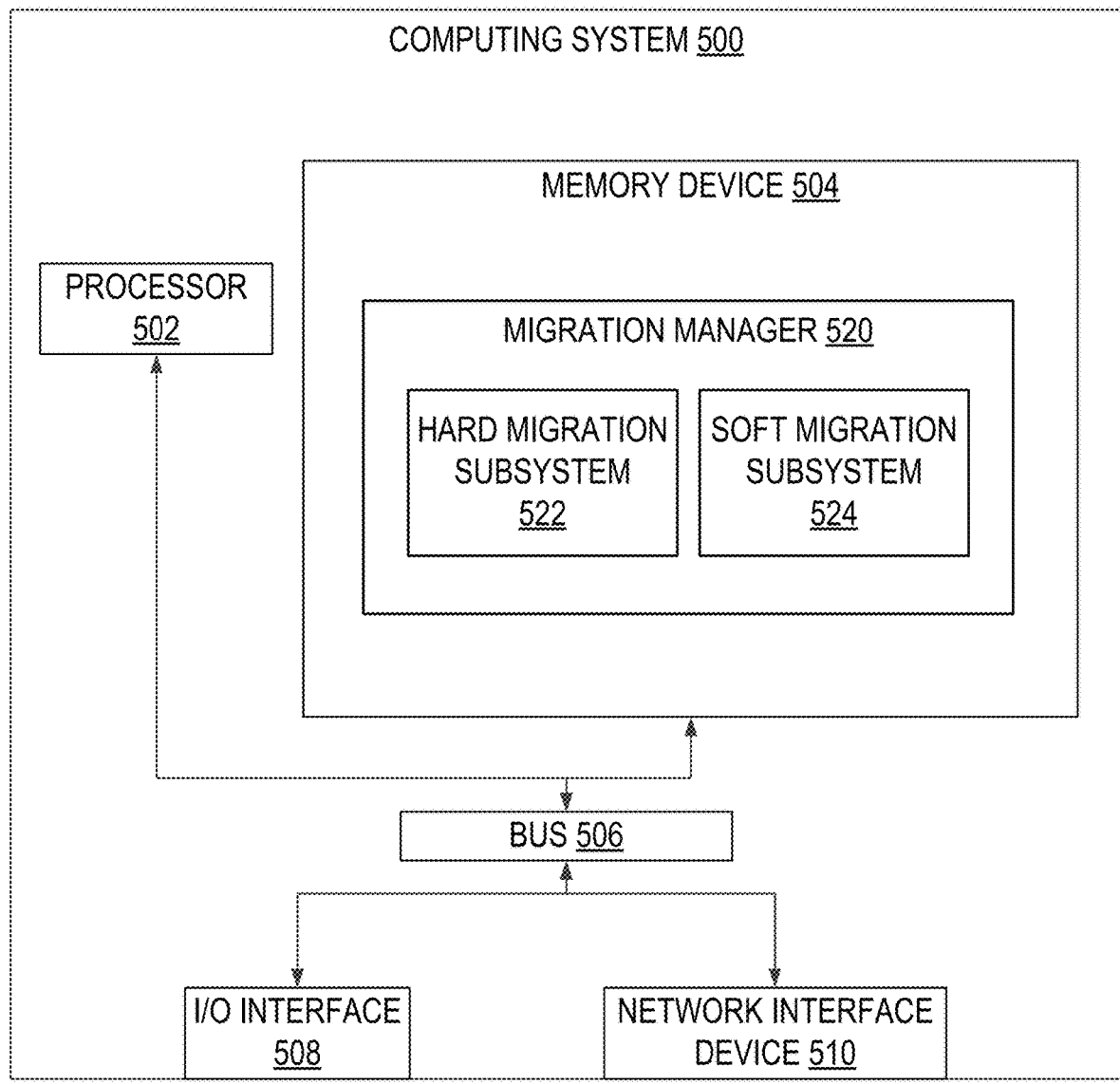
FIG. 5 is a diagram of a computing system that can act as a node in the wireless mesh network, according to some implementations described herein.

FIG. 5 is a diagram of an example of a computing system 500 that acts as a node 120 in the wireless mesh network 100, according to some implementations described herein. For instance, the computing system 500 can act as a subject node 120, a PAN coordinator 115, or some other node 120 in the wireless mesh network 100. The computing system 500 may be a general-purpose computing device or a specialized computing device, such as a utility meter or gateway. The depicted example of the computing system 500 includes a processor 502 communicatively coupled to one or more memory devices 504. The processor 502 executes computer-executable program code stored in a memory device 504. Examples of the processor 502 include a microprocessor, an application-specific integrated circuit (ASIC), a field-programmable gate array (FPGA), or another suitable processing device. The processor 502 can include one or more processing devices.

The memory device 504 includes a suitable non-transitory computer-readable medium for storing data, program code, or both. A computer-readable medium can include an electronic, optical, magnetic, or other storage device capable of providing a processor with computer-readable instructions or other program code. Non-limiting examples of a computer-readable medium include a magnetic disk, memory chip, read-only memory (ROM), random-access memory (RAM), optical storage, magnetic tape or other magnetic storage, or another medium from which a processing device can read instructions.

In some implementations, the computing system 500 executes program code that configures the processor 502 to perform one or more of the operations described herein. The program code includes, for example, instructions for implementing one or more of the following: a hard migration subsystem 522 for performing hard migration as described herein; a soft migration subsystem 524 for performing soft migration as described herein; or a migration manager 520 for determining whether to migrate, selecting a destination PAN 110 for the migration, and initiating the hard migration subsystem 522 or the soft migration subsystem 524 to perform, respectively, hard migration or soft migration. The program code may be resident in the memory device 504 or a suitable computer-readable medium and may be executed by the processor 502 or other suitable processor.

The computing system 500 may include one or more external or internal devices, such as input or output devices. For example, the computing system 500 is shown with one or more input/output ("I/O") interfaces 508. One or more buses 506 are also included in the computing system 500. The bus 506 communicatively couples one or more components of the computing system 500.

An implementation of the computing system 500 includes a network interface device 510, such as a radio. The network interface device 510 includes one or more devices suitable for establishing a wired or wireless data connection to other computing devices in the wireless mesh network 100. Non-limiting examples of the network interface device 510 include an Ethernet network adapter, a Wireless Fidelity (WiFi) device, a Near-Field Communication (NFC) device, a Wireless Smart Utility Network (Wi-SUN) device, a radio frequency (RF) device, a ZigBee device, or some other communication device. Using the network interface device 510, the computing system 500 may communicate with other nodes of the wireless mesh network 100 and may thus perform the operations described herein.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
   receiving, by a node connected to a first personal area network (PAN), a packet from a second PAN other than the first PAN;
   determining, based on the packet, that a second instability factor related to stability of the second PAN differs by at least a margin from a first instability factor related to stability of the first PAN;
   transmitting, to a neighboring node in the first PAN, a migration notification message indicating that the node is migrating;
   receiving, from the neighboring node in the first PAN, a request for the node to remain in the first PAN;
   applying, by the node, one or more rules to the request to reject the request for the node to remain in the first PAN; and
   completing migration to the second PAN based on rejecting the request.

2. The method of claim 1, wherein the migration notification message indicates a notification period during which the node will accept from neighboring nodes requests for the node to remain in the first PAN, and the method further comprising sending, by the node, a join request to the second PAN after expiration of the notification period.

3. The method of claim 1, wherein the migration notification message indicates a notification period during which the node will accept from neighboring nodes requests for the node to remain in the first PAN, and the method further comprising transmitting, by the node, prior to expiration of the notification period, a request to join the second PAN.

4. The method of claim 1, wherein the node is configured to perform migration using a first migration mode, and wherein the node is configured to perform the migration using a second migration mode, and wherein the node selects between the first migration mode and the second migration mode.

5. The method of claim 4, wherein selecting between the first migration mode and the second migration mode for the migration is based on the first instability factor.

6. The method of claim 4, wherein the node selects the first migration mode for the migration based on classification of the node as a battery-operated node.

7. The method of claim 6, wherein the node selects the second migration mode for the migration based on classification of the node as a critical node.

8. The method of claim 4, wherein the node selects the second migration mode as a result of failing to complete the migration in the first migration mode.

9. The method of claim 1, further comprising computing the first instability factor based on a historical packet success rate in the first PAN.

10. The method of claim 1, further comprising transmitting, by the node, to a PAN coordinator of the first PAN, a notification of migration, wherein the node receives from the PAN coordinator a request that the node terminate the migration.

11. The method of claim 1, wherein determining, based on the packet, that the second instability factor differs by at least the margin from the first instability factor comprises:
    receiving, by the node, a migration request from a child node of the node;
    reduce the margin to an updated margin based on the migration request; and
    determining that the second instability factor differs from the first instability factor by at least the updated margin.

12. A system comprising:
    a subject node connected to a first personal area network (PAN) of a wireless mesh network, wherein the subject node is configured to:
        identify a destination PAN as a target of migration; and
        transmit to one or more neighboring nodes a notification that the subject node is migrating to the destination PAN; and
    a neighboring node of the node, wherein the neighboring node is connected to the first PAN and configured to:
        receive the notification from the subject node;
        determine a reason, selected from a predetermined set of reasons, for objecting to migration of the subject node; and
        transmitting to the subject node a request to terminate the migration;
    wherein the subject node is further configured to exit the first PAN and join the destination PAN, based on prioritizing an anticipated improvement in stability due to the migration over the reason associated with the request from the neighboring node.

13. The system of claim 12, wherein the subject node delays the migration based on an additional request from a PAN coordinator of the first PAN.

14. The system of claim 12, wherein, to identify the destination PAN as the target of the migration, the subject node is further configured to:
    compute a first instability factor for the first PAN based on routing cost, link quality, number of nodes in the first PAN, and packet success rate of the first PAN; and
    determine that a second instability factor differs by at least a margin from the first instability factor.

15. The system of claim 14, wherein the subject node is configured to perform the migration using a first migration mode, and wherein the node is configured to perform the migration using a second migration mode, and wherein the node selects between the first migration mode and the second migration mode based on at least one of a classification of the subject node or a value of the first instability factor.

16. The system of claim 14, wherein, to determine that the second instability factor differs by at least the margin from the first instability factor, the subject node is further configured to:
   receive a migration request from a child node of the node;
   reduce the margin to an updated margin based on the migration request; and
   determine that the second instability factor differs from the first instability factor by at least the updated margin.

17. A computing device connected to a first personal area network (PAN) of a wireless mesh network, the computing device comprising:
   a processor configured to execute computer-readable instructions;
   a memory configured to store the computer-readable instructions that, when executed by the processor, cause the processor to perform operations comprising:
      receiving a packet from a second PAN other than the first PAN;
      determining, based on the packet, that a second instability factor related to stability of the second PAN differs by at least a margin from a first instability factor related to stability of the first PAN;
      transmitting, to a neighboring node in the first PAN, a migration notification message indicating that the computing device is migrating;
      receiving, from the neighboring node in the first PAN, a request for the computing device to remain in the first PAN;
      applying one or more rules to the request to reject the request for the computing device to remain in the first PAN; and
      completing migration to the second PAN based on rejecting the request.

18. The computing device of claim 17, wherein the migration notification message indicates a notification period during which the computing device will accept from neighboring nodes requests for the computing device to remain in the first PAN, and the operations further comprising sending a join request to the second PAN after expiration of the notification period.

19. The computing device of claim 17, wherein the migration notification message indicates a notification period during which the computing device will accept from neighboring nodes requests for the computing device to remain in the first PAN, and the operations further comprising transmitting, prior to expiration of the notification period, a request to join the second PAN.

20. The computing device of claim 17, wherein determining, based on the packet, that the second instability factor differs by at least the margin from the first instability factor comprises:
   receiving a migration request from a child node of the computing device;
   lowering a threshold difference based on the migration request; and
   determining that the second instability factor differs from the first instability factor by at least the threshold difference.

* * * * *